US008733129B2

(12) United States Patent
Eda et al.

(10) Patent No.: US 8,733,129 B2
(45) Date of Patent: *May 27, 2014

(54) GLASS SUBSTRATE FOR MAGNETIC DISK AND MANUFACTURING METHOD THEREOF

(75) Inventors: Shinji Eda, Nirasaki (JP); Hideki Isono, Kofu (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/979,176

(22) Filed: Dec. 27, 2010

(65) Prior Publication Data

US 2011/0159321 A1 Jun. 30, 2011

(30) Foreign Application Priority Data

Dec. 29, 2009 (JP) ................................. 2009-299249

(51) Int. Cl.
*G11B 5/82* (2006.01)
*C03C 19/00* (2006.01)
*B24B 41/06* (2012.01)
*C03C 3/00* (2006.01)
*C03B 11/00* (2006.01)
*C03B 11/08* (2006.01)
*C03B 11/12* (2006.01)

(52) U.S. Cl.
CPC .............. *B24B 41/06* (2013.01); *C03B 11/005* (2013.01); *C03B 11/08* (2013.01); *C03B 11/125* (2013.01)
USPC ...... 65/62; 65/66; 65/112; 65/133; 428/846.9

(58) Field of Classification Search
CPC .... G11B 5/8404; B24B 41/06; C03B 11/005; C03B 11/08; C03B 11/125
USPC ............. 65/61, 162, 29.16, 29.19, 30.1, 33.1, 65/68, 82, 111, 112, 102, 105, 133, 334, 3, 65/25.1, 23, 26, 38, 40, 64, 66, 62, 29.11, 65/158, 305; 501/70; 428/410, 846.9
See application file for complete search history.

(56) References Cited

U.S. PATENT DOCUMENTS 4,015,967 A * 4/1977 Ward, Jr. .......................... 65/133
6,442,972 B1 * 9/2002 Watson ............................... 63/3

(Continued)

FOREIGN PATENT DOCUMENTS

JP 63248727 A 10/1988
JP 01133948 A 5/1989

(Continued)

OTHER PUBLICATIONS

Yoshikawa et al (JP 2008-254166) (machine) translation, Oct. 2008.*

(Continued)

*Primary Examiner* — Kevin M. Bernatz
*Assistant Examiner* — Louis Falasco
(74) *Attorney, Agent, or Firm* — Global IP Counselors, LLP

(57) ABSTRACT

The present invention provides a method for efficiently manufacturing a glass substrate for magnetic disk having good accuracy of a surface irregularity and an impact resistance. The method includes the steps of: performing press forming to molten glass to prepare a sheet glass material, the sheet glass material having a roughness of the principal surface of 0.01 μm or less and target flatness of a glass substrate for magnetic disk; chemically strengthening the sheet glass material by dipping the sheet glass material in a chemically strengthening salt, thereby preparing a disk substrate; polishing the principal surfaces of the disk substrate. A thickness of the sheet glass material prepared in the press forming step is larger than a target thickness of the glass substrate for magnetic disk by a polishing quantity of the principal surface polishing step.

9 Claims, 9 Drawing Sheets

(56) References Cited

U.S. PATENT DOCUMENTS

| | | | |
|---|---|---|---|
| 6,442,975 B1 * | 9/2002 | Murakami et al. | 65/61 |
| 2002/0139145 A1 * | 10/2002 | Murakami | 65/102 |
| 2003/0154744 A1 * | 8/2003 | Hirota et al. | 65/102 |
| 2004/0194506 A1 * | 10/2004 | Ueda et al. | 65/29.11 |
| 2004/0194508 A1 * | 10/2004 | Nishimoto et al. | 65/33.1 |
| 2005/0204777 A1 * | 9/2005 | Mori et al. | 65/112 |
| 2005/0244656 A1 * | 11/2005 | Ikenishi et al. | 501/70 |
| 2005/0279137 A1 * | 12/2005 | Fukuyama et al. | 65/162 |
| 2007/0204654 A1 * | 9/2007 | Fukumoto et al. | 65/29.19 |
| 2007/0295030 A1 * | 12/2007 | Nakamura et al. | 65/29.16 |
| 2008/0104996 A1 | 5/2008 | Minazawa | |
| 2009/0001619 A1 * | 1/2009 | Miyazaki | 264/1.1 |

FOREIGN PATENT DOCUMENTS

| | | | |
|---|---|---|---|
| JP | 01164738 A | | 6/1989 |
| JP | 06171959 A | | 6/1994 |
| JP | 10011748 A | | 1/1998 |
| JP | 11228150 A | | 8/1999 |
| JP | 2001-192216 | * | 7/2001 |
| JP | 2002097037 A | | 4/2002 |
| JP | 2003030822 A | | 1/2003 |
| JP | 2003054965 A | | 2/2003 |
| JP | 2003128425 A | | 5/2003 |
| JP | 2004196651 A | | 7/2004 |
| JP | 3709033 B2 | | 8/2005 |
| JP | 2005263574 A | | 9/2005 |
| JP | 2008105894 A | | 5/2008 |
| JP | 2008174401 A | | 7/2008 |
| JP | 2008-254166 A | | 10/2008 |
| JP | 2008273779 A | | 11/2008 |
| JP | 2009099249 A | | 5/2009 |
| JP | 2009211782 A | | 9/2009 |
| JP | 2009269762 A | | 11/2009 |

OTHER PUBLICATIONS

Kogure (JP 63-248727) translation, Oct. 1988.*
English translation JP 2001-192216, Jul. 2001, Tsutomu.*
International Search Report of corresponding International Application No. PCT/JP2010/007534, dated Feb. 1, 2011.
Japanese Office Action of corresponding Japanese Patent Application No. 2012-074005, dated on Nov. 20, 2012.

* cited by examiner

HEAVE (FLATNESS)
  WAVINESS
  MICROWAVINESS
  ROUGHNESS
$\begin{pmatrix} \text{ARITHMETIC AVERAGE} \\ \text{ROUGHNESS Ra} \end{pmatrix}$

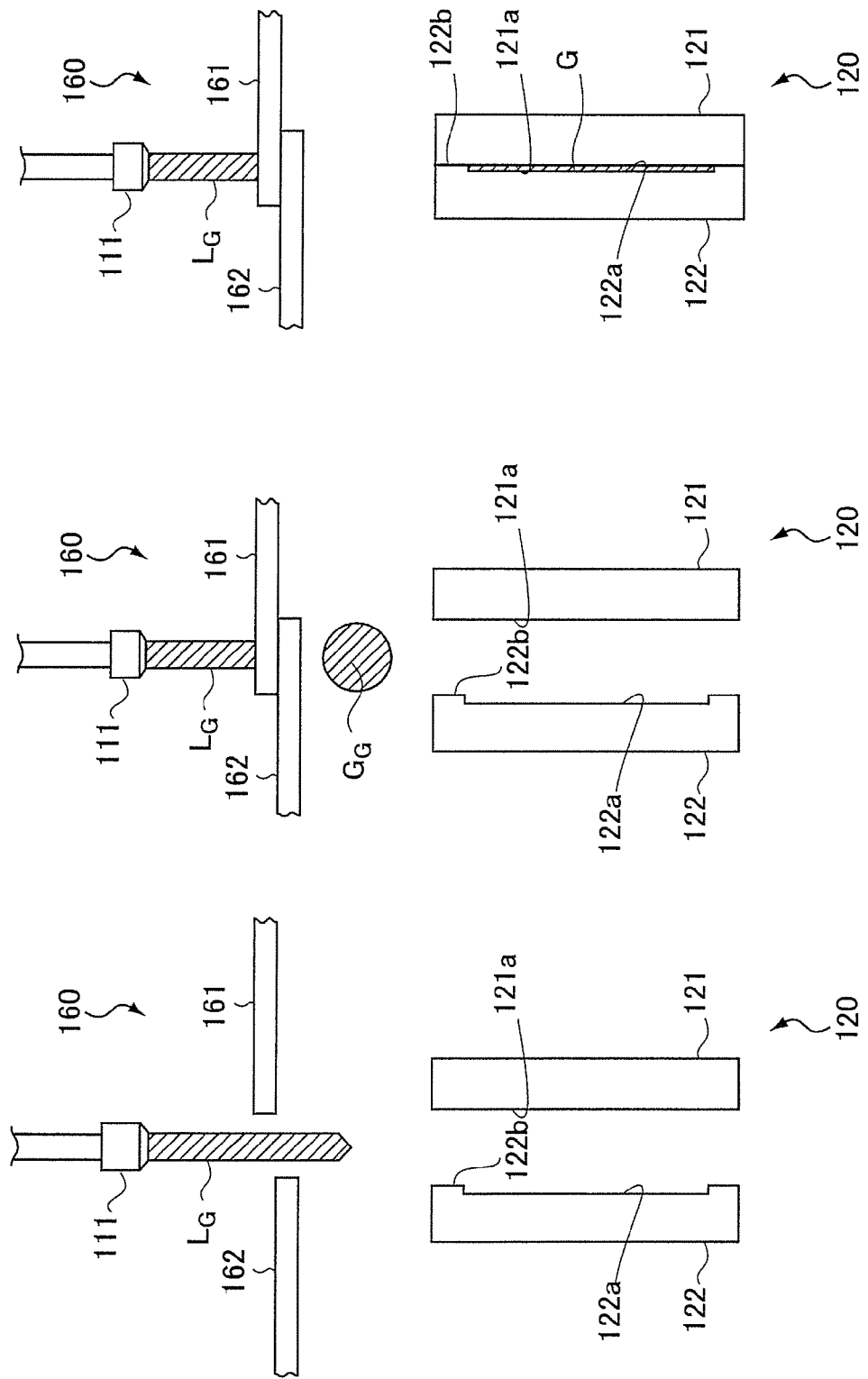

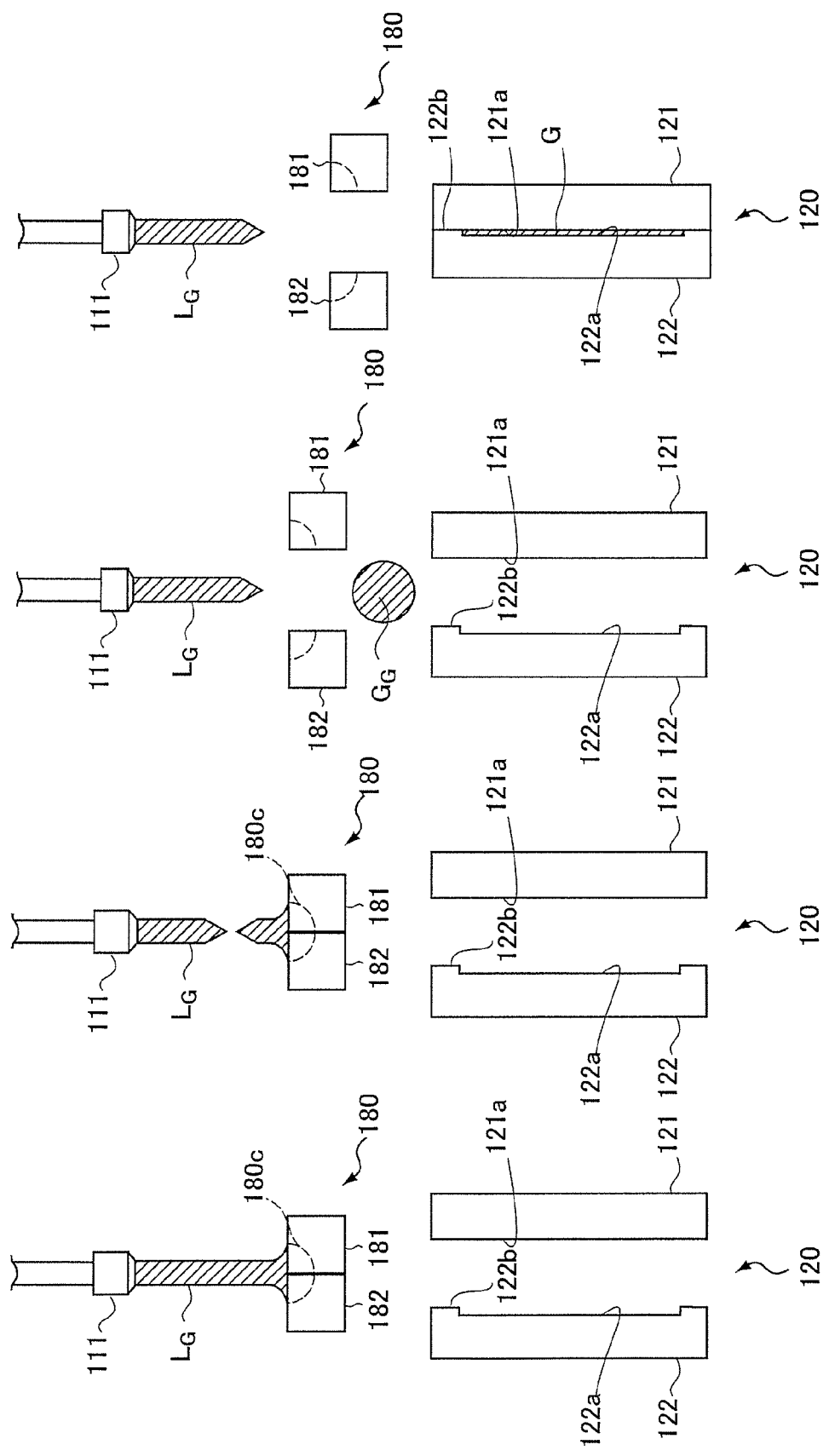

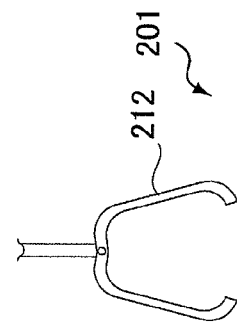
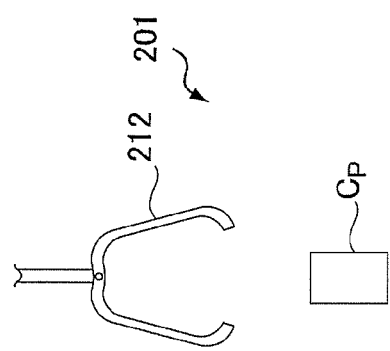
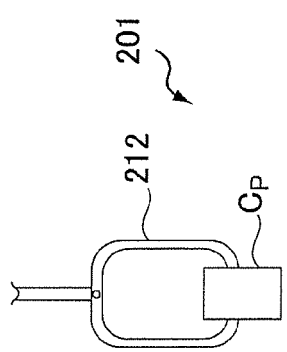
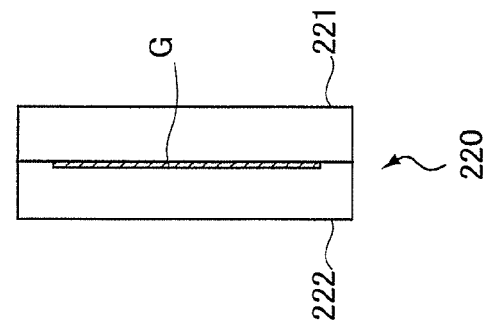
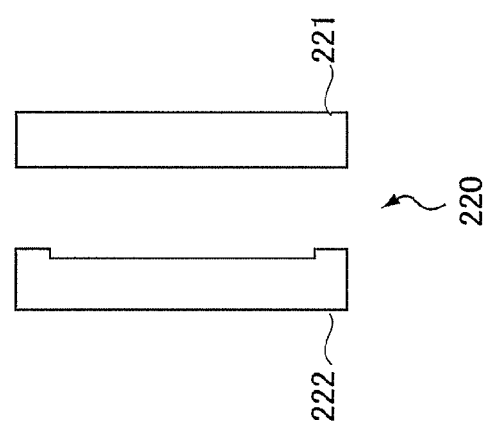
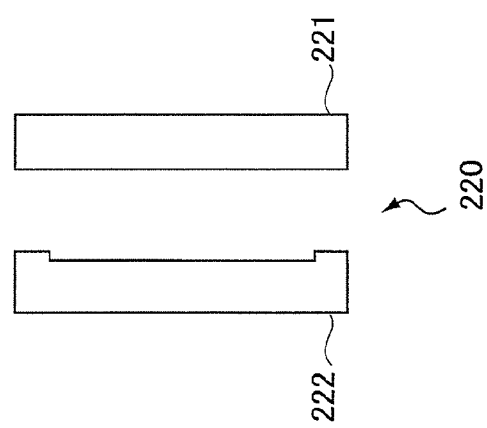
FIG.8A  FIG.8B  FIG.8C

GLASS SUBSTRATE FOR MAGNETIC DISK AND MANUFACTURING METHOD THEREOF

CROSS-REFERENCE TO RELATED APPLICATION

This application is based upon and claims the benefit of priority of the prior Japanese Patent Application No. 2009-299249, filed on Dec. 29, 2009, the entire contents of which are incorporated herein by reference.

FIELD

The present invention relates to a glass substrate for magnetic disk having a pair of principal surfaces and a manufacturing method thereof.

BACKGROUND

Recently, a hard disk device is incorporated in a personal computer, a notebook personal computer, and a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for the magnetic disk because substrate is hardly plastically deformed compared with a metallic substrate.

The magnetic recording density is being increased in order to correspond to a demand for an increase of a storage capacity in the hard disk device. For example, a magnetic recording information area is finely formed using a perpendicular magnetic recording system in which a magnetization direction of the magnetic layer is oriented toward a direction perpendicular to the substrate surface, which allows the storage capacity to be increased in one disk substrate. In order to correspond to the further increase of the storage capacity, a floating distance of the magnetic head from the magnetic recording surface is extremely shortened to form the fine magnetic recording information area. In the substrate of the magnetic disk, the magnetic layer is formed flat such that the magnetization direction of the magnetic layer is oriented toward the direction substantially perpendicular to the substrate surface. Therefore, the glass substrate is formed such that surface irregularity of the glass substrate is decreased as much as possible.

The shortened floating distance of the magnetic head easily causes a head crush trouble or a thermal asperity trouble. Because these troubles are generated by the micro irregularity or a particle on the magnetic disk surface, the glass substrate is formed such that the surface irregularity in an end face is also decreased as much as possible in addition to the principal surface.

A press forming method and a floating method are well known as a method for manufacturing the sheet glass material that becomes a base of the glass substrate used in the magnetic disk.

For example, Japanese Patent No. 3709033 discloses a press forming method as the method for manufacturing the glass material that becomes the base of the glass substrate used in the magnetic disk. In the disclosed press forming method, a glass gob made of molten glass is supplied onto a lower die that is a backing gob forming die, and press forming is performed to the glass gob using the lower die and an upper die that is a counter gob forming die. More specifically, the glass substrate used in the magnetic disk is manufactured by the following method: a glass gob made of molten glass is supplied onto a lower die that is a backing gob forming die; press forming is performed to the glass gob to prepare a sheet glass material using the lower die and an upper die that is a counter gob forming die; and the sheet glass material is formed into am information recording medium glass substrate.

However, the surface irregularity of the sheet glass material formed in accordance with the conventional method is not sufficient for the surface irregularity accuracy of the principle surfaces for the high density of the magnetic recording and the fine magnetic recording information area.

For example, in forming the sheet glass material, a mold release agent is applied to the die surface in order to prevent the glass material from fusing to the die surfaces of the upper die and lower die. The surface roughness of the principal surface of the sheet glass material is increased because of the mold release agent. There is a large surface temperature difference between the upper die and the lower die, and the lower die to which the glass gob (a lump of the glass material) is supplied becomes high temperature. Because the surface temperature difference causes a temperature distribution in a thickness direction of the formed sheet glass material and in a plane of the plate, a shrinkage quantity of the sheet glass material that is taken out from the die and cooled also has a distribution in the thickness direction of the formed sheet glass material and in the plane of the plate. The sheet glass material is easy to warp, and therefore good flatness of the formed sheet glass material is not achieved.

With the sheet glass material obtained by the conventional press forming method, it is necessary that the flatness of the sheet glass material be improved up to the flatness required as a glass substrate for magnetic disk. Therefore, a grinding process is performed to the sheet glass material after the press forming, thereby improving the flatness of the glass material. However, performing the grinding process becomes an additional process in the manufacturing of the glass substrate for magnetic disk, and further performing the grinding process caused a "roll-off problem".

That is, a machining allowance (ground quantity) is increased in the grinding process because the flatness is not so good with the conventional press forming method. For example, the machining allowance is about 200 μm with the conventional press forming method. When the machining allowance is increased in the grinding process, a deep crack is generated in the surface of the sheet glass material. Therefore, in a polishing process subsequent to the grinding process, the machining allowance (polishing quantity) is inevitably increased such that the deep crack is not left. Here, when the machining allowance is increased in the polishing process in which the loose abrasive grain and the resin polisher are used, the neighborhood in the outer circumferential edge portion is rounded in the principal surface of the sheet glass material to cause a "roll-off problem" of the edge portion. That is, because the neighborhood in the outer circumferential edge portion is rounded in the sheet glass material, a distance between the magnetic layer and the magnetic head in the neighborhood of the outer circumferential edge portion becomes larger than the floating distance of the magnetic head in another portion of the glass substrate when the magnetic disk is prepared using the sheet glass material as the glass substrate. The surface irregularity is generated because the neighborhood of the outer circumferential edge portion has the rounded shape. As a result, the recording and reading operations of the magnetic head are not precisely performed in the magnetic layer in the neighborhood of the outer circumferential edge portion. That is, the recordable and readable regions are reduced. The above is the "roll-off problem".

Because the sheet glass material having the sufficient flatness is not obtained with the conventional press forming method, it takes a relatively longer time to perform the grinding process that is the post-process, and then the "roll-off problem" is generated by the grinding process.

On the other hand, with the floating method, the sheet glass material is obtained by continuously flowing the molten glass in a bath filled with molten metal such as tin. The molten glass is flown along a traveling direction in the bath to which an exact temperature operation is performed, and the belt-shaped glass ribbon is formed while finally adjusted to desired thickness and width. The sheet glass material that becomes the base of the glass substrate used in the magnetic disk is cut out from the glass ribbon. Because the tin surface in the bath is kept horizontal, the sheet glass material obtained by the floating method has the sufficiently high surface flatness.

In the other aspect, a predetermined impact resistance is required for the glass substrate used in the magnetic disk. Therefore, a chemically strengthening process is performed to the sheet glass material that becomes the base of the glass substrate in order to improve the impact resistance of the glass substrate.

The chemically strengthening process is performed as follows. A mixed solution of potassium nitrate and sodium sulfate is used as a chemically strengthening solution. For example, the chemically strengthening solution is heated to 300° C. to 400° C. For example, after the washed sheet glass material is preheated to 200° C. to 300° C., the sheet glass material is dipped in the chemically strengthening solution for 3 to 4 hours. Therefore, ion replacement with sodium ion and potassium ion occurs in the surface layer of the glass material to form a compressive stress layer. Accordingly, the crack that is possibly generated in the surface of the glass material hardly progresses to the inside of the glass material. The compressive stress layer formed through the chemically strengthening process has the thickness of about 50 to 200 μm.

However, when the chemically strengthening process is performed to the extremely-high-flatness sheet glass material obtained by the floating method, unfortunately a warp is generated in the sheet glass material. That is, in the sheet glass material obtained by the floating method, a tin diffusion layer having a thickness of about 10 to 50 μm is inevitably formed in one of the surfaces of the sheet glass material by tin used as the molten metal, and the tin diffusion layer is not formed in the other surface. When the chemically strengthening process is performed to the sheet glass material, the warp is generated to degrade the flatness because the compressive stress layers formed both the surfaces differs from each other by the presence or absence of tin diffusion layer. Therefore, when the chemically strengthening is performed, it is necessary that a grinding process for removing the tin diffusion layer be performed to the surface in which the tin diffusion layer is produced in the sheet glass material obtained by the floating method.

In summary, with the conventional press forming method, the grinding process is required because the sheet glass material having the sufficiently flatness is not obtained. With the floating method, although the sheet glass material having the sufficiently flatness is obtained, the grinding process is required to remove the tin diffusion layer of the material surface.

In the above regard, an object of the invention is to provide a method for efficiently manufacturing the glass substrate for magnetic disk having the good surface irregularity accuracy and impact resistance.

SUMMARY OF THE INVENTION

In accordance with an aspect of the invention, there is provided a method for manufacturing a glass substrate for magnetic disk including a pair of principal surfaces, the method including the steps of: performing press forming to molten glass to prepare a sheet glass material, the sheet glass material having a roughness of the principal surface of 0.01 μm or less and target flatness of a glass substrate for magnetic disk; chemically strengthening the sheet glass material by dipping the sheet glass material in a chemically strengthening salt containing an alkali metal ion to form a compressive stress layer at least on the principal surfaces of the sheet glass material, thereby preparing a disk substrate; polishing the principal surfaces of the disk substrate by pressing the polishing pad against the principal surfaces of the disk substrate while supplying a polishing solution including a polishing material between the disk substrate and the polishing pad, and relatively moving the disk substrate and the polishing pad. In the method, a thickness of the sheet glass material prepared in the press forming step is larger than a target thickness of the glass substrate for magnetic disk by a polishing quantity of the principal surface polishing step.

Accordingly, the formed sheet glass material has the principal surface roughness of 0.01 or less and the target flatness of the glass substrate for magnetic disk. The thickness of the sheet glass material is larger than the target thickness of the glass substrate for magnetic disk by the polishing quantity of the glass substrate for magnetic disk. Because the sheet glass material obtained through the press forming step has the good surface irregularity accuracy, only the polishing process is performed to the sheet glass material in the surface treatment process, but the grinding process having the machining allowance larger than that of the polishing process is not performed to the principal surface. The good impact resistance is obtained by the compressive stress layer formed through the chemically strengthening process. Therefore, the glass substrate for magnetic disk having the good surface irregularity accuracy and impact resistance can efficiently be produced.

Preferably the press forming step includes the steps of: causing a lump of the molten glass to fall down; and forming the sheet glass material by performing the press forming to the lump while sandwiching the lump between surfaces of a pair of dies from both sides of a falling path of the lump, the dies being disposed opposite each other, the dies being set to substantially same temperature. Accordingly, the sheet glass material having the principal surface roughness of 0.01 μm or less, the flatness necessary as the glass substrate for magnetic disk, and the target thickness of the glass substrate for magnetic disk can be prepared by the press forming.

Preferably, the pair of dies is opened immediately after the press forming is performed to the lump while the lump is sandwiched between the surfaces of the pair of dies in the step of forming the sheet glass material.

Preferably, the target flatness as the glass substrate for magnetic disk is 4 μm or less.

Preferably, the manufacturing method of glass substrate for magnetic disk further comprises the step of scribing the sheet glass material between the forming step and the polishing step.

Preferably, a glass substrate for magnetic disk that is manufactured by the above manufacturing method of glass substrate for magnetic disk has the principal surface with the flatness of 4 µm or less and the roughness of 0.2 nm or less.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Referring now to the attached drawings which form a part of this original disclosure:

FIG. 5A to FIG. 5C are views illustrating an example of the press forming performed by the apparatus of FIG. 4;

FIG. 7A to FIG. 7D are views illustrating still another example of the press forming performed by the apparatus of FIG. 4;

FIG. 8A to FIG. 8C are views illustrating still another example of the press forming performed by the apparatus of FIG. 4.

DESCRIPTION OF EMBODIMENT(S)

A manufacturing method of glass substrate for magnetic disk and a glass substrate for magnetic disk according to an embodiment of the present invention will be described in detail below.

Figure 1A:
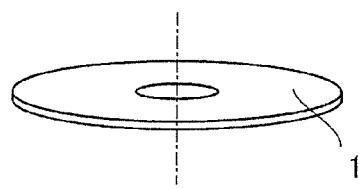
FIG. 1A to FIG. 1C are views illustrating a magnetic disk prepared using a glass substrate for magnetic disk according to an embodiment of the invention.
Figure 1B:
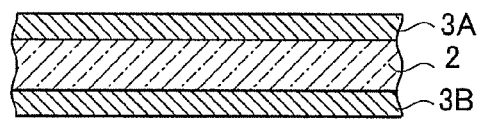
Figure 1C:
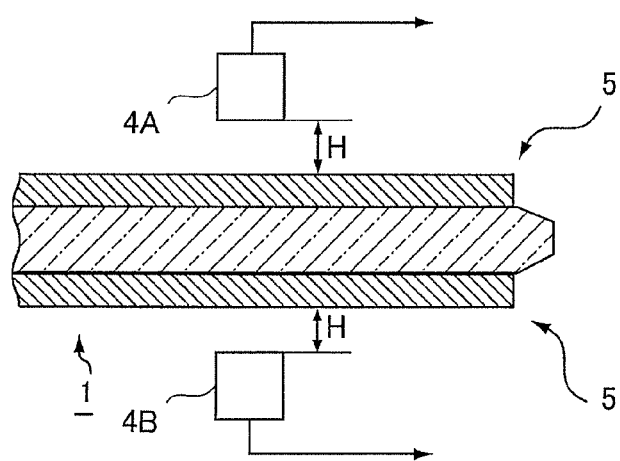
Figure 2A:
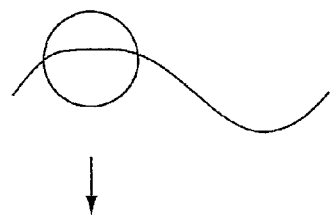
FIG. 2A to FIG. 2D are views illustrating a surface irregularity in a sheet glass material or a glass substrate.
Figure 2B:
Figure 2C:
Figure 2D:

FIG. 1A to FIG. 1C are views illustrating a magnetic disk that is prepared using a glass substrate for magnetic disk of the embodiment of the invention.

(Magnetic Disk and Glass Substrate for Magnetic Disk)

In a magnetic disk 1 of FIG. 1A used in a hard disk device, layers 3A and 3B including at least magnetic layers (perpendicular magnetic recording layers) are formed on principal surfaces of a ring glass substrate 2 as illustrated in FIG. 1B. More specifically, although not illustrated in FIG. 1, an adhesive layer, a soft magnetic layer, a non-magnetic underlying layer, the perpendicular magnetic recording layer, a protective layer, and a lubricant layer are sequentially stacked. For example, a Cr alloy is used in the adhesive layer, and the adhesive layer acts as a bonding layer to the glass substrate 2. For example, a CoTaZr alloy is used as the soft magnetic layer, a granular non-magnetic layer is used as the non-magnetic underlying layer, and a granular magnetic layer is used as the perpendicular magnetic recording layer. For example, a material containing carbon hydride is used as the protective layer, and a fluorine resin is used as the lubricant layer.

The magnetic disk 1 will be described with a more specific example. A CrTi adhesive layer, a CoTaZr/Ru/CoTaZr soft magnetic layer, a CoCrSiO$_2$ granular non-magnetic underlying layer, a CoCrPt—SiO$_2$.TiO$_2$ granular magnetic layer, and a carbon hydride protective layer are sequentially deposited in both the principal surfaces of the glass substrate 2 with an in-line type sputtering apparatus. A perfluoropolyether lubricant layer is deposited on the uppermost layer by a dipping method to form the magnetic layers 3A and 3B.

As illustrated in FIG. 1C, magnetic heads 4A and 4B of a hard disk device float from surfaces of the magnetic disk 1 by 5 nm in the condition of high-speed rotation, for example, 7200 rpm, of the magnetic disk 1. That is, a distance H in FIG. 1C is 5 nm. At this point, the magnetic heads 4A and 4B record and read pieces of information in and from the magnetic layers. The floating of the magnetic heads 4A and 4B can closely record and read the information in and from the magnetic layer of the magnetic disk 1 without sliding the magnetic heads 4A and 4B onto the magnetic layer, thereby realizing a fine magnetic recording information area and high density of the magnetic recording.

At this point, a central portion of the glass substrate 2 of the magnetic disk 1 to an outer circumferential edge portion 5 are precisely processed with target surface irregularity accuracy, and the magnetic heads 4A and 4B can be precisely operated while the distance H of about 5 nm is maintained.

A surface treatment process performed to the surface irregularity of the glass substrate 2 does not include a grinding process having a relatively large machining allowance, but only includes first polishing and second polishing processes having relatively small machining allowances.

The principal surface of the glass substrate 2 used in the magnetic disk 1 has surface irregularity in which flatness is 4 µm or less and surface roughness is 0.2 nm or less. The flatness of 4 µM or less is target flatness required for the glass substrate for magnetic disk as a final product. For example, the flatness can be measured with a flatness tester FT-900 manufactured by NIDEK CO., LTD. The roughness of the principal surface is expressed by arithmetic average roughness Ra defined by JIS B0601:2001. When the roughness ranges from 0.006 µm to 200 µm, for example, the roughness is measured with a roughness measuring machine SV-3100 manufactured by Mitutoyo Corporation, and the roughness can be computed by a method defined by JIS B0633:2001. As a result of the measurement, when the roughness is 0.03 µm or less, for example, the roughness is measured with a scanning probe microscope (atomic force microscope) manufactured by SIT Nano Technology Inc, and the roughness can be computed by a method defined by JIS R1683:2007.

In the embodiment, the sheet glass material of pre-polishing process was measured with the roughness measuring machine, and the glass substrate of post-polishing was measured with the scanning probe microscope (atomic force microscope).

FIG. 2A to FIG. 2D are views illustrating the surface irregularity. The surface irregularity can be classified into four irregularities according to a wavelength of the irregularity.

Specifically, the surface irregularity is classified into heave having the largest wavelength (wavelength of about 0.6 µm to about 130 mm), waviness (wavelength of about 0.2 µm to about 1 mm), micro-waviness (wavelength of 0.1 µm to 1 mm), and roughness (wavelength of 10 nm or less).

The heave can be expressed by the flatness as an index, and the roughness can be expressed by the arithmetic average roughness Ra as an index.

With the manufacturing method of the embodiment, the sheet glass material of pre-polishing process obtained after the press forming has the following property: the roughness of the principal surface is 0.01 μm or less, and the flatness has the target flatness of the glass substrate for magnetic disk. The sheet glass material prepared by the press forming has a thickness larger than the target thickness of the glass substrate for magnetic disk by the polishing quantity of the polishing process. That is, the thickness of the sheet glass material of the post-press forming is the thickness added to the target thickness of the glass substrate for magnetic disk of the final product by the small machining allowance of the polishing process. The glass substrate for magnetic disk is prepared without performing the grinding process for adjusting the flatness and the thickness to the sheet glass material of the post-press forming. For example, "the target flatness of the glass substrate for magnetic disk" is 4 μm or less. The reason the surface flatness of the sheet glass material is set to 4 μm or less is that the flatness of the glass substrate 2 used in the magnetic disk 1 is maintained and therefore the magnetic heads 4A and 4B can properly perform the recording and reading operations. For example, the sheet glass material having the principal surface roughness of 0.01 μm or less, the target flatness of the glass substrate for magnetic disk, and the thickness larger than the target thickness of the glass substrate for magnetic disk by the polishing quantity of the principal surface polishing, can be achieved by the press forming of the embodiment. On the other hand, the sheet glass material having the principal surface roughness of 0.01 μm or less, the target flatness of the glass substrate for magnetic disk, and the thickness larger than the target thickness of the glass substrate for magnetic disk by the polishing quantity of the principal surface polishing, cannot be achieved by the conventional press forming.

According to the manufacturing method of the embodiment, after the press forming, the glass substrate for magnetic disk having the flatness of 4 μm or less and the surface roughness of 0.2 nm or less can be obtained through the first polishing process and the second polishing process.

At this point, the reason the surface roughness of the sheet glass material of the post-press forming is set to 0.01 μm or less is because surface roughness can be adjusted to 0.2 nm by the two-time polishing process without increasing the machining allowance. Further, when the surface roughness is 0.01 μm or less, the scribing can efficiently be performed to the sheet glass material.

The surface irregularity of a sheet glass material G can be achieved by adjusting the surface roughness of the die in the press forming.

For example, aluminosilicate glass, soda-lime glass, and borosilicate glass can be used as a material for the glass substrate 2 of the magnetic disk 1. Particularly, the aluminosilicate glass can be suitably used in that chemically strengthening can be performed and in that the glass substrate for magnetic disk excellent for the flatness of the principal surface and the strength of the substrate can be prepared.

A chemically strengthened glass material mainly containing by molar percent of 57 to 74% $SiO_2$, 0 to 2.8% $ZnO_2$, 3 to 15% $Al_2O_3$, 7 to 16% $LiO_2$, and 4 to 14% $Na_2O$ is suitably used as the aluminosilicate glass.

(Manufacturing Method of Glass Substrate for Magnetic Disk)

Figure 3:
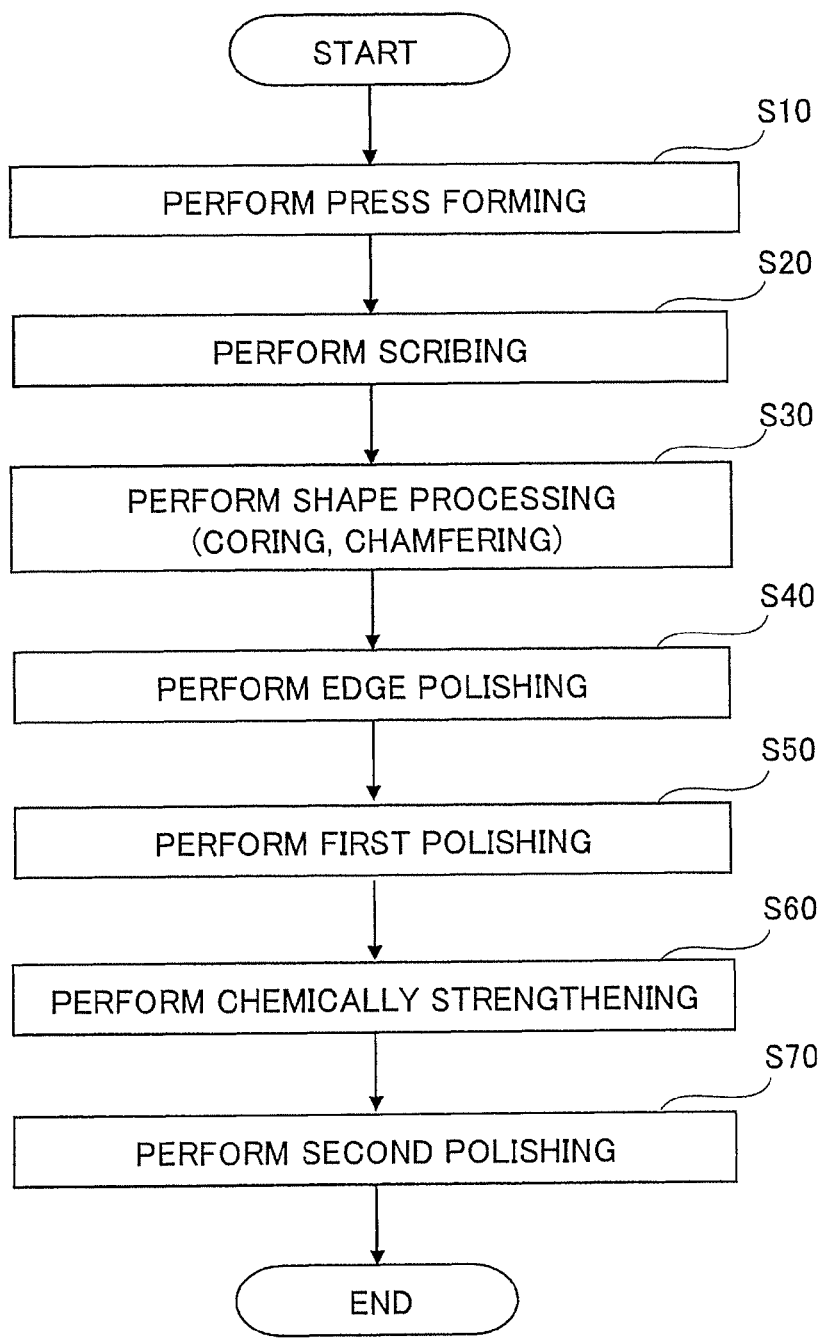
FIG. 3 is a view illustrating a flow of a manufacturing method for glass substrate for magnetic disk according to an embodiment of the invention.

FIG. 3 is a view illustrating a flow of a manufacturing method for glass substrate for magnetic disk of the embodiment. In the flow of FIG. 3, a first polishing process in Step S50 and a second polishing process in Step S70 constitute a surface treatment process of performing mirror-surface finishing to the principal surface of the sheet glass material. The sheet glass material is prepared by the press forming (Step S10). The prepared sheet glass material has the principal surface roughness of 0.01 μm or less, the target flatness of the glass substrate for magnetic disk, and a thickness larger than the target thickness of the glass substrate for magnetic disk by a polishing quantity of the principal surface polishing.

Figure 4:
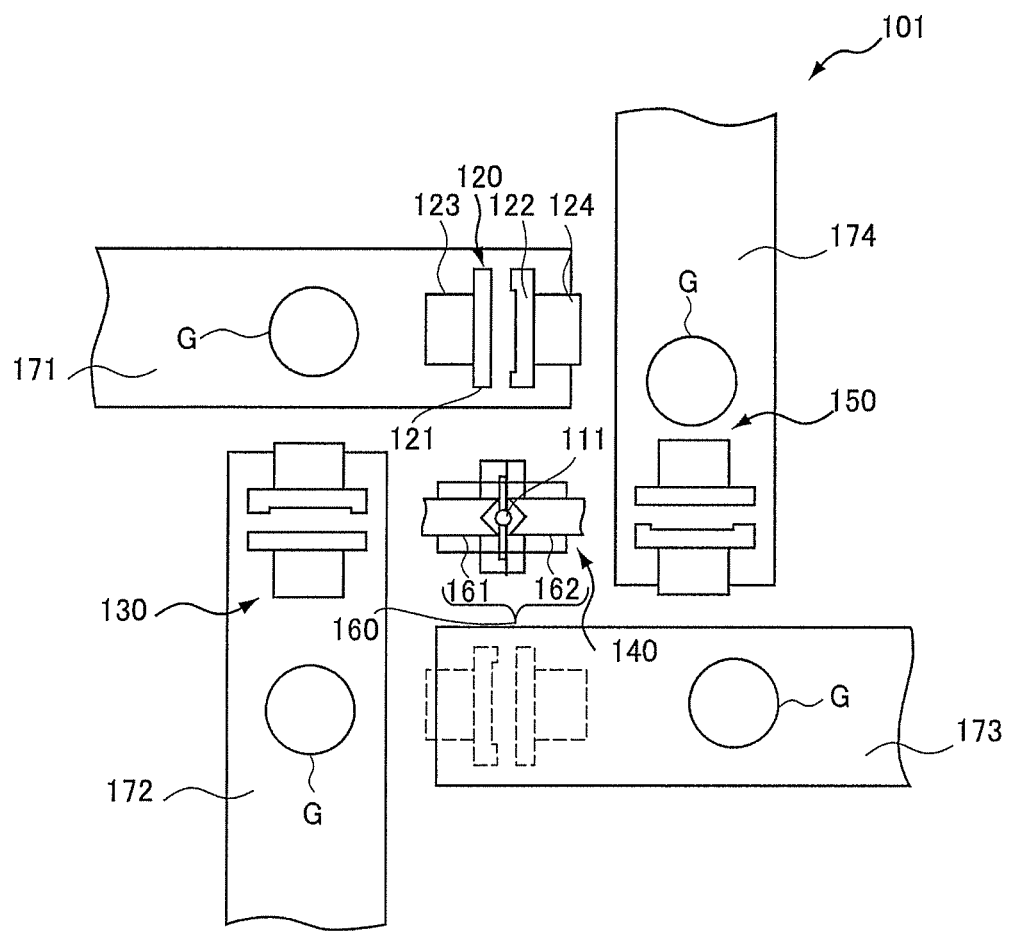
FIG. 4 is a plan view of an apparatus used in press forming of FIG. 3.

For example, the press forming is performed with an apparatus illustrated in FIG. 4 and FIG. 5. The press forming can also be performed with an apparatus illustrated in FIG. 6, FIG. 7, and FIG. 8. FIG. 4 is a plan view of an apparatus 101 used in the press forming, FIGS. 5 to 8 are views illustrating a state in which the apparatus performs the press forming when viewed from a side face.

(a) Press Forming Process

An apparatus 101 illustrated in FIG. 4 includes four sets of press units 120, 130, 140, and 150 and a cutting unit 160. The cutting unit 160 is provided on a path of the molten glass that flows out from a molten glass outflow port 111. In the apparatus 101, a lump of the molten glass cut by the cutting unit 160 is caused to fall down, and the lump is pressed from both sides of the falling path of the lump while sandwiched between surfaces of a pair of dies set to the substantially same temperature, thereby forming the sheet glass material.

Specifically, as illustrated in FIG. 4, in the apparatus 101, the four sets of press units 120, 130, 140, and 150 are provided at intervals of 90 degrees around the molten glass outflow port 111.

As used herein, "the substantially same temperature" means that an absolute value of a temperature difference between a temperature at a press forming surface of first press forming die constituting the pair of dies and a temperature at a press forming surface of a second press forming die is 10° C. or less. More preferably the absolute value of the temperature difference is 5° C. or less, most preferably the absolute value of the temperature difference is 0° C. When a temperature distribution exists in the press forming surface, "the temperature at the press forming surface" means a temperature near a center portion of the press forming surface.

Preferably the lump is brought into contact with the surfaces of the pair of dies in substantially the same timing, and the press forming is performed while the lump is sandwiched between the surfaces of the pair of dies in the substantially same timing. "The lump is brought into contact with the surfaces of the pair of dies in substantially the same timing" means that the absolute value of the time difference between the time the molten glass lump comes into contact with one of the press forming surfaces and the time the molten glass lump comes into contact with the other press forming surface is 0.1 second or less. More preferably the absolute value of the time difference 0.05 second or less, most preferably the absolute value of the time difference is 0 second.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 4) is located immediately below the molten glass outflow port 111. The retreat position (positions in which the press units 120, 130, and 150 are drawn by solid lines in FIG. 4 and a position in which the press units 140 is drawn by a broken line in FIG. 4) is located away from the molten glass outflow port 111.

The cutting unit 160 is provided on a path of the molten glass between the catch position and the molten glass outflow port 111. The cutting unit 160 forms the lump (hereinafter also referred to as "gob") of the molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123, and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing the disk-shaped sheet glass material G. Then, after the press unit moves to the retreat position, the first die and the second die are separated to cause the formed sheet glass material G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the sheet glass material G falling down from the corresponding press unit, and the conveyer conveys the sheet glass material G to an apparatus (not illustrated) of the next process.

The apparatus 101 is configured such that the press units 120, 130, 140, and 150 sequentially move to the catch position and move to the retreat position while the gob is sandwiched, so that the sheet glass material G can continuously be formed without waiting for the cooling of the sheet glass material G in each press unit.

FIG. 5A to FIG. 5C more specifically illustrate the press forming performed by the apparatus 101. FIG. 5A is a view illustrating the state before the gob is made, FIG. 5B is a view illustrating the state in which the gob is made by the cutting unit 160, and FIG. 5C is a view illustrating the state in which the sheet glass material G is formed by pressing the gob.

As illustrated in FIG. 5A, a molten glass material $L_G$ continuously flows out from the molten glass outflow port 111. At this point, the cutting unit 160 is driven in predetermined timing to cut the molten glass material $L_G$ using the cutting blades 161 and 162 (FIG. 5B). Therefore, the cut molten glass becomes a substantially spherical gob $G_G$ due to a surface tension thereof. In the example illustrated in FIG. 5, an outflow quantity per time of the molten glass material $L_G$ and a driving interval of the cutting unit 160 are adjusted such that a gob $G_G$ having a radius of about 10 mm is formed every time the cutting unit 160 is driven.

The made gob $G_G$ falls down toward a gap between the first die 121 and second die 122 of the press unit 120. At this point, the first driving unit 123 and the second driving unit 124 (see FIG. 4) are driven such that the first die 121 and the second die 122 come close to each other at the timing the gob $G_G$ enters the gap between the first die 121 and the second die 122. Therefore, as illustrated in FIG. 5C, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape. A projected spacer 122b is provided in the inner circumferential surface 122a of the second die 122 in order to keep the gap between the inner circumferential surface 121a of the first die 121 and the inner circumferential surface 122a of the second die 122 constant. A gap between the inner circumferential surface 121a of the first die 121 and the inner circumferential surface 122a of the second die 122 are adjusted such that the sheet glass material having the thickness larger than the target thickness of the glass substrate for magnetic disk by the polishing quantity of the principal surface polishing can be prepared.

A temperature control mechanism (not illustrated) is provided in each of the first die 121 and second die 122, and temperatures at the first die 121 and second die 122 is retained sufficiently lower than a glass transition temperature $T_G$ of the molten glass $L_G$.

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass, thereby preparing the disk-shaped sheet glass material G. In the embodiment, for example, the sheet glass material G is a disk-shaped plate having a diameter of 75 to 80 mm and a thickness of about 1 mm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the sheet glass material G is sufficiently cooled (until the sheet glass material G becomes at least a temperature below a yield point). Then, the first driving unit 123 and the second driving unit 124 are driven to separate the first die 121 and the second die 122, the sheet glass material G falls down from the press unit 120, and the conveyer 171 located below the press unit 120 receives the sheet glass material G (see FIG. 4).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a deformation is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, the shrinkage quantity of the glass material has the small distribution, and the large deformation is not generated in the sheet glass material G. Accordingly, the principal surface flatness of the prepared sheet glass material G is improved better than that of the sheet glass material prepared by the conventional press forming, and the principal surface flatness of the prepared sheet glass material G can be set to 4 μm or less.

The surface roughness of the inner circumferential surface 121a and the surface roughness of the inner circumferential surface 122a are adjusted such that the arithmetic average roughness Ra of the sheet glass material G is 0.01 μm or less.

In the example illustrated in FIG. 5, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 6A:
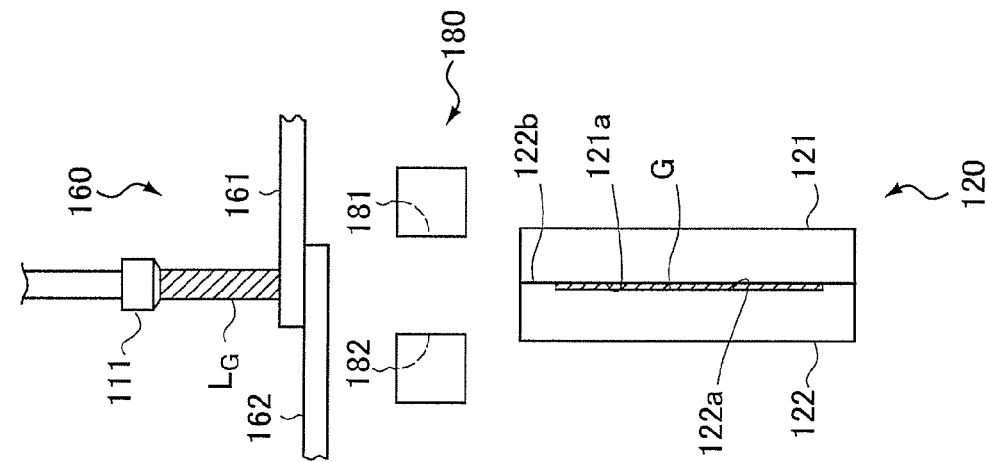
FIG. 6A to FIG. 6C are views illustrating another example of the press forming performed by the apparatus of FIG. 4.
Figure 6B:
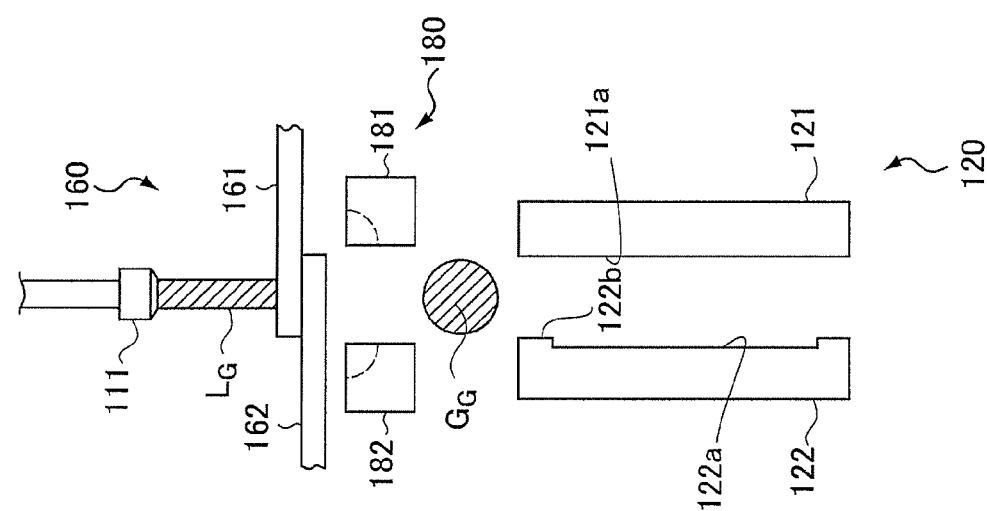
Figure 6C:
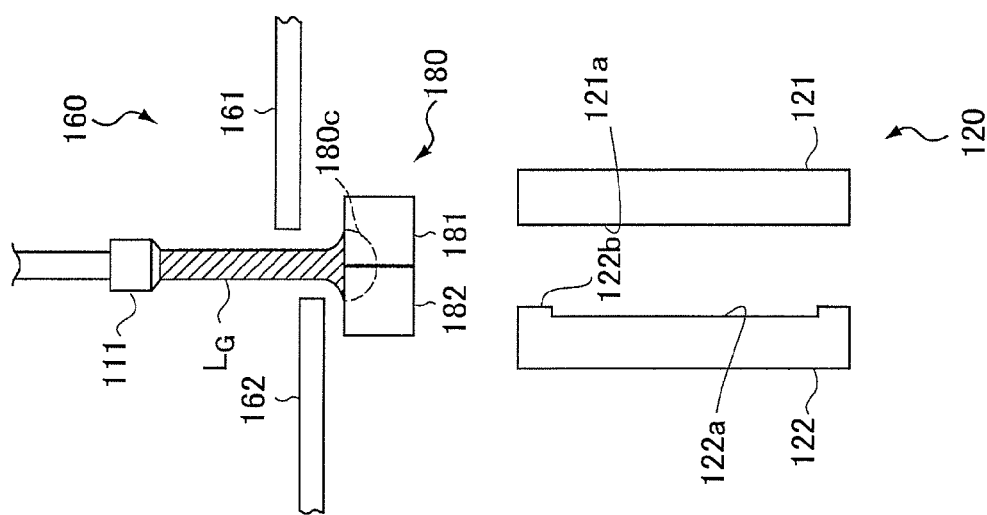

FIGS. 6A to 6C are views illustrating a modification of the embodiment of FIG. 5. The gob forming die is used in the modification. FIG. 6A is a view illustrating the state before the gob is made, FIG. 6B is a view illustrating the state in which the gob $G_G$ is made by the cutting unit 160 and a gob forming die 180, and FIG. 6C is a view illustrating the state in which the press forming is performed to the gob $G_G$ to make the sheet glass material G.

As illustrated in FIG. 6A, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in FIG. 6B, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in FIG. 6C, during the fall of the gob $G_G$, the spherical gob $G_G$ is sandwiched between the first die 121 and the second die 122 to perform the press forming, thereby preparing the disk-shaped sheet glass material G.

Alternatively, as illustrated in FIGS. 7A to 7D, in the apparatus 101, instead of using the cutting unit 160 illustrated in FIGS. 6A to 6C, a moving mechanism that moves the gob forming die 180 in an upstream direction or a downstream direction along the path of the molten glass $L_G$ may be used. FIGS. 7A and 7B are views illustrating the state before the gob $G_G$ is made, FIG. 7C is a view illustrating the state in which the gob $G_G$ is made by the gob forming die 180, and FIG. 7D is a view illustrating the state in which the press forming is performed to the gob $G_G$ to make the sheet glass material G.

As illustrated in FIG. 7A, the recess 180C formed by the blocks 181 and 182 receives the molten glass $L_G$ flowing out from the molten glass outflow port 111. As illustrated in FIG. 7B, the blocks 181 and 182 are quickly moved onto the downstream side of the flow of the molten glass $L_G$ at predetermined timing, thereby cutting the molten glass $L_G$. Then, as illustrated in FIG. 7C, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in FIG. 7D, during the fall of the spherical gob $G_G$, the spherical gob $G_G$ is sandwiched between the first die 121 and the second die 122 to perform the press forming, thereby preparing the disk-shaped sheet glass material G.

FIGS. 8A to 8C are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. FIG. 8A is a view illustrating the state before the lump of the heated optical glass is formed, FIG. 8B is a view illustrating the state in which the lump of the optical glass falls down, and FIG. 8C is a view illustrating the state in which the press forming is performed to the lump of the optical glass to make the sheet glass material G.

As illustrated in FIG. 8A, in an apparatus 201, a glass material grasping mechanism 212 conveys the lump $C_P$ of the optical glass to a position above a press unit 220. As illustrated in FIG. 8B, the glass material grasping mechanism 212 releases the lump $C_P$ of the optical glass to cause the lump $C_P$ of the optical glass to fall down. As illustrated in FIG. 8C, during the fall of the lump $C_P$ of the optical glass, the lump $C_P$ is sandwiched between the first die 221 and the second die 222 to perform the press forming. Because the first die 221 and the second die 222 have the same configuration and action as those of the first die 121 and second die 122 illustrated in FIG. 5, the descriptions are omitted.

(b) Scribing Process

After the press forming, scribing is performed to the formed sheet glass material G as illustrated in FIG. 3 (Step S20).

As used herein, the scribing means that two concentric (inside concentric and outside concentric) cutting-plane lines (scratch in the form of a line) are provided in the surface of the sheet glass material G with a scriber made of a super alloy or diamond particles in order to obtain the donut-shape (ring-shape) of the formed sheet glass material G having a predetermined size. The sheet glass material G scribed into two-concentric-circle shape is partially heated, and a portion outside the outside concentric circle and a portion inside the inside concentric circle are removed by a difference in thermal expansion of the sheet glass material G, thereby obtaining the donut-shaped sheet glass material.

As described above, the cutting-plane line can suitably be provided with the scriber, because the sheet glass material G produced through the (a) press forming process has the roughness of 0.01 μm or less. In the case in which the roughness of the sheet glass material exceeds 1 μm, the scriber does not precisely trace on the surface, and cutting-plane line may not be evenly provided. Even in such case, the sheet glass material may be prepared so as to have an outer diameter and circularity to an extent in which the scribing is not required, and a round hole is made in the sheet glass material with a core drill, thereby obtaining the ring sheet glass material.

(c) Shape processing Process (Chamfering Process)

Then shape processing is performed to the scribed sheet glass material G (Step S30). The shape processing includes chamfering (chamfering of outer circumferential end portion and inner circumferential end portion). In the chamfering process, the outer circumferential end portion and inner circumferential end portion of the disk-shaped sheet glass material G are chamfered using a diamond abrasive grain.

(d) Edge polishing Process

Then end face polishing is performed to the sheet glass material G (Step S40).

In the end face polishing, the mirror-surface finishing is performed to an inner-circumferential-side end face and an outer-circumferential-side end face of the sheet glass material G by brush polishing. At this point, slurry that includes fine particles such as cerium oxide as the loose abrasive grain is used. The contamination of dust and damage such as a flaw are removed by performing the edge polishing. Therefore, generation of ions such as a sodium and potassium which cause corrosion can be prevented.

(e) First Polishing (Principal Surface Polishing) Process

The first polishing is performed to the ground principal surface of the sheet glass material G (Step S50). The first polishing is intended to remove the flaw left on the principal surface and the deformation.

For example, the first polishing has the machining allowance of several micrometers to about 10 micrometers. In the manufacturing method of the embodiment, because the grinding process having the large machining allowance is not performed, the flaw and deformation that may be caused by the grinding process are not generated for the sheet glass material G. Therefore, the machining allowance can be reduced in the first polishing process.

A double-side polishing apparatus 3 illustrated in FIG. 9 is used in the first polishing process and the subsequent second polishing process. With the double-side polishing apparatus 3, the polishing is performed using a polishing pad 10 by relatively moving the sheet glass material G and the polishing pad 10.

Figure 9A:
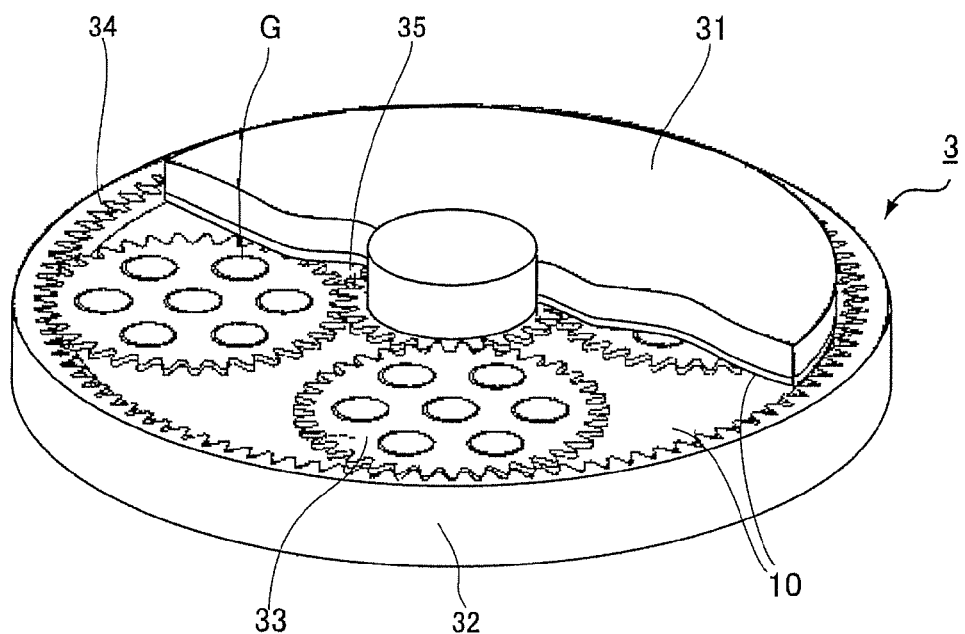
FIG. 9A and FIG. 9B are views illustrating a double-side polishing apparatus used in first polishing and second polishing of FIG. 3.
Figure 9B:
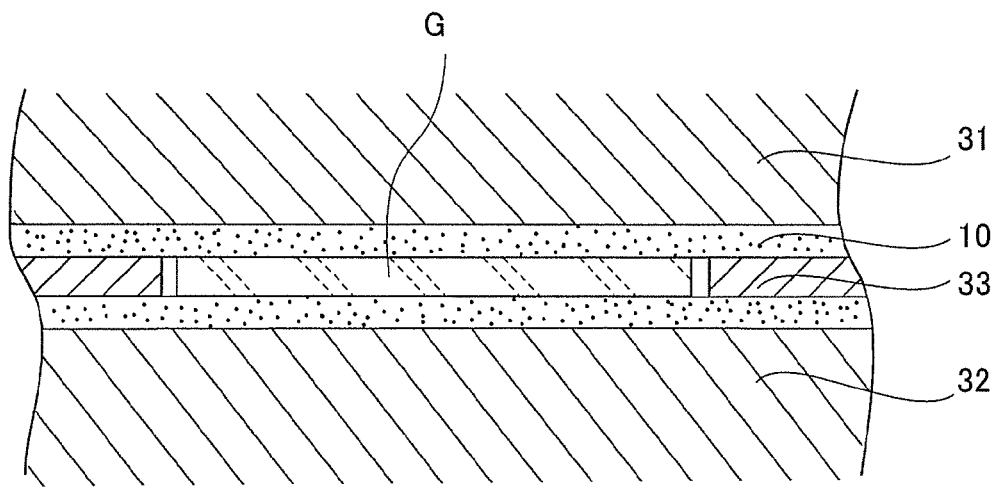

FIG. 9A is an explanatory view of a driving mechanism of the double-side polishing apparatus, while FIG. 9B is a sectional view of a main part of the double-side polishing apparatus including upper and lower surface plates. As illustrated in FIG. 9A, the double-side polishing apparatus 3 includes a polishing carrier attaching unit, an upper surface plate 31, and a lower surface plate 32. The polishing carrier attaching unit includes internal gear 34 and a sun gear 35, which are rotated at a predetermined rotation ratio. The upper surface plate 31 and the lower surface plate 32 are reversely rotated while sandwiching the polishing carrier attaching unit therebetween. The polishing pads 10 adhere to the surfaces of the upper surface plate 31 and the lower surface plate 32 that are facing each other. A polishing carrier 33 is attached so as to engage the internal gear 34 and the sun gear 35, and the polishing carrier 33 performs planet gear movement in which the polishing carrier 33 rotates while revolving around the sun gear 35.

The plural sheet glass materials G are retained in the polishing carrier 33. The upper surface plate 31 can vertically be moved, and the upper surface plate 31 presses the polishing pad 10 against the pair of principal surfaces of the sheet glass material G as illustrated in FIG. 9B. While slurry (polishing solution) including the polishing abrasive grain (polishing material) is supplied, the sheet glass material G and the polishing pad 10 are relatively moved by the planet gear movement of the polishing carrier 33 and the mutual reverse rotations of the upper surface plate 31 and lower surface plate 32, thereby polishing the pair of principal surfaces of the sheet glass material G.

In the first polishing process, for example, a hard resin polisher is used as the polishing pad, and a cerium oxide abrasive grain is used as the polishing material.

(f) Chemically Strengthening Process

After the first polishing, the sheet glass material G is chemically strengthened (Step S60).

For example, a mixed solution of potassium nitride (60%) and sodium sulfate (40%) can be used as a chemically strengthening solution. In the chemically strengthening, for example, the chemically strengthening solution is heated to 300° C. to 400° C., the washed sheet glass material G is pre-heated to 200° C. to 300° C., and the sheet glass material G is dipped in the chemically strengthening solution for three to four hours. Preferably, in order that the whole principal surfaces of the sheet glass material G are chemically strengthened, the dipping is performed while the plural sheet glass materials G are accommodated in a holder by retaining the sheet glass materials G at the end faces.

When the sheet glass material G is dipped in the chemically strengthening solution, the lithium ion and the sodium ion in the surface layer of the sheet glass material G are replaced with the sodium ion and the potassium ion which have relatively large ion radiuses in the chemically strengthening solution, respectively, thereby forming a compressive stress layer having a thickness of about 50 to 200 µm. Therefore, the sheet glass material G is strengthened to have good impact resistance. The sheet glass material G to which the chemically strengthening treatment is performed is washed. For example, after washing the sheet glass material G using the sulfuric acid, the sheet glass material G is washed using pure water and IPA (isopropyl alcohol).

(g) Second Polishing (Final Polishing) Process

Then second polishing is performed to the sheet glass material G to which the chemically strengthening treatment and washing are sufficiently performed (Step S80). For example, the second polishing has the machining allowance of about 1 µm.

The second polishing is intended at the mirror-surface polishing of the principal surface. In the second polishing process, similarly to the first polishing process, the polishing is performed to the sheet glass material G using the double-side polishing apparatus 3 (see FIG. 9). However, the second polishing process differs from the first polishing process in the polishing abrasive grain included in the polishing solution (slurry) used and a composition of the polishing pad 10. In the second polishing process, compared with the first polishing process, the particle diameter of the polishing abrasive grain used is decreased and hardness of the polishing pad 10 is softened. For example, in the second polishing process, a soft foaming resin polisher is used as the polishing pad, and a cerium oxide abrasive grain that is finer than the cerium oxide abrasive grain used in the first polishing process is used as the polishing material.

The sheet glass material G polished through the second polishing process is washed again. The washing is performed using neutral detergent, pure water, and IPA.

The glass substrate for magnetic disk 2 having the surface irregularity, in which the flatness of the principal surface is 4 µm or less and the roughness of the principal surface is 0.2 nm or less, is obtained by the second polishing.

Then, as illustrated in FIG. 1, the layers such as the magnetic layer are deposited on the glass substrate for magnetic disk 2 to prepare the magnetic disk 1.

The flow of the manufacturing method illustrated in FIG. 3 is described above.

As described above, according to the manufacturing method of the embodiment, the sheet glass material having the surface irregularity in which principal surface flatness is 4 µm or less and the principal surface roughness is 0.01 µm or less, can be formed by the press forming process. Therefore, the grinding process for improving the flatness and the grinding process having the machining allowance as large as about 200 μm are omitted after the press forming. Obviously, with the manufacturing method of the embodiment, because the sheet glass material is not produced by the floating method, the tin diffusion layer is not formed in the principal surface, and a grinding process is not therefore required to remove the tin diffusion layer. In the first polishing process and second polishing of the process manufacturing method of the embodiment, the sheet glass material G has the machining allowance as small as about 10 μm, and the machining allowance is smaller than the thickness (about 50 to 200 μm) of the compressive stress layer. Therefore, there is not generated the conventional "roll-off problem" that is caused by the large machining allowance in the grinding process and therefore the large machining allowance in the polishing process.

The good impact resistance is obtained by the compressive stress layer that is formed through the chemically strengthening process after the press forming. Obviously, with the manufacturing method of the embodiment, the imbalance of the compressive stress layer caused due to the tin diffusion layer formed only on one side of the principal surfaces, does not occur because the sheet glass material is not produced by the floating method.

According to the manufacturing method of the embodiment, the glass substrate for magnetic disk having the good surface irregularity accuracy and impact resistance can efficiently be produced.

In the flow of FIG. 3, the chemically strengthening (Step S60) is performed between the first polishing (Step S50) and the second polishing (Step S70). However the sequence is not limited to the embodiment. As long as the second polishing process (Step S70) is performed after the first polishing process (Step S50), the chemically strengthening (Step S60) may appropriately be replaced. For example, the first polishing process, the second polishing process, and the chemically strengthening process (hereinafter, the process sequence 1) may be performed in this order. However, in the process sequence 1, because the surface irregularity that is possibly generated by the chemically strengthening process is not removed, the process sequence illustrated in FIG. 3 is performed more preferably.

EXAMPLES

Examples and Comparative Examples

Hereinafter, the effectiveness of the method illustrated in FIG. 3 was confirmed by Examples and Comparative examples.

In Examples and Comparative examples, the alminosilicate glass (57 to 74% $SiO_2$, 0 to 2.8% $ZnO_2$, 3 to 15% $Al_2O_3$, 7 to 16% $LiO_2$, and 4 to 14% $Na_2O$) was used as the glass material.

The magnetic layer was formed on the prepared glass substrate using in-line type sputtering apparatus. Specifically, the CrTi adhesive layer, the CoTaZr/Ru/CoTaZr soft magnetic layer, the $CoCrSiO_2$ granular non-magnetic underlying layer, the CoCrPt—$SiO_2$.$TiO_2$ granular magnetic layer, and the carbon hydride protective layer were sequentially deposited on both the principal surfaces of the glass substrate. Then the perfluoropolyether lubricant layer was deposited on the deposited uppermost layer by a dipping method, thereby obtaining the magnetic disk.

Examples 1 to 5

The glass substrate was prepared through Steps S20 to S70 illustrated in FIG. 3 using the sheet glass material having the principal surface flatness of 4 μm or less and the principal surface roughness ranging from 0.001 μm to 0.01 μm. The sheet glass material was formed by the press forming method illustrated in FIGS. 4 and 5.

Comparative Examples 1 to 6

The glass substrate was prepared through Steps S20 to S70 illustrated in FIG. 3 using the sheet glass material having the principal surface flatness of 4 μm or less and the principal surface roughness ranging from 0.011 μm to 1.334 μm. The sheet glass material was formed by the press forming method illustrated in FIGS. 4 and 5.

Comparative Examples 7 and 8

The glass substrate was prepared through Steps S20 to S70 illustrated in FIG. 3 using the sheet glass material having the principal surface flatness of 4 μm or less and the principal surface roughness ranging from 0.001 μm to 0.002 μm. The sheet glass material was formed by the floating method.

Comparative Examples 9 to 11

The glass substrate was prepared through Steps S20 to S70 illustrated in FIG. 3 using the sheet glass material having the principal surface flatness exceeding 4 μm and the principal surface roughness ranging from 0.004 μm to 0.006 μm. The sheet glass material was formed by the conventional press method.

The conditions of the grinding and polishing of Examples and Comparative examples were set as follows:

The first polishing process: the polishing was performed using a cerium oxide abrasive grain (average particle size; diameter of 1 μm to 2 μm) as a polishing material and a hard urethane pad as a polishing pad, and the machining allowance of about 3 μm.

The second polishing process: the polishing was performed using colloidal silica (average particle size; diameter of 0.1 μm) as a polishing material and a soft polyurethane pad as a polishing pad, and the machining allowance of about 1 μm.

The flatness and surface roughness (the flatness and surface roughness of post-forming) of the glass substrate obtained by each of Examples and Comparative examples were measured.

The LUL (Load/UnLoad) endurance test (600,000 times) was performed to evaluate floating stability of the magnetic head with respect to the magnetic disk that was prepared based on the glass substrate obtained by each of Examples and Comparative examples. The LUL endurance test is one that checks error occurrence, dirt of head after test, and abnormality generation such as abrasion by operating the HDD (hard disk device) in a cycle of lamp→ID stop→lamp→ID stop→ . . . while the HDD is placed in a thermo-hygrostat of 70° C. and 80%. After the LUL test of 80000 times/day×7.5 days=600000 times in which 10 HDDs were used with respect to Examples and Comparative examples, the test result was evaluated as fail when abnormality was generated even in one HDD.

Table 1 illustrates the roughness of the principal surface, forming method, and flatness (pre-forming and post-forming) in Examples 1 to 5 and Comparative examples 1 to 11 and the LUL endurance test result (pass or fail). In the surface roughness of the post-forming in Table 1, "OK" indicates that the surface roughness satisfies a criteria of 0.2 nm or less (the criteria required as the glass substrate for magnetic disk), and "NOK" indicates that the surface roughness does not satisfy the criteria of 0.2 nm or less.

As can be also seen from Table 1, when the glass material formed by the conventional press forming method has the flatness exceeding 4 μm and the surface roughness of 0.01 μm

TABLE 1

| | Glass material | | | Evaluation | | |
|---|---|---|---|---|---|---|
| | Surface roughness (JIS B0601) [μm] | Forming method | Flatness [μm] | Flatness after processing | Surface roughness after processing (0.2 nm or less) | LUL endurance test (600000 times) |
| Example 1 | 0.001 | press method | 1.02 | 1.13 | OK | Pass |
| Example 2 | 0.002 | press method | 3.79 | 3.81 | OK | Pass |
| Example 3 | 0.005 | press method | 2.34 | 2.31 | OK | Pass |
| Example 4 | 0.006 | press method | 3.56 | 3.58 | OK | Pass |
| Example 5 | 0.010 | press method | 1.74 | 1.73 | OK | Pass |
| Comparative Example 1 | 0.011 | press method | 2.10 | 2.13 | NOK | Fail |
| Comparative Example 2 | 0.058 | press method | 1.47 | 1.49 | NOK | Fail |
| Comparative Example 3 | 0.188 | press method | 3.93 | 3.80 | NOK | Fail |
| Comparative Example 4 | 0.361 | press method | 3.52 | 3.56 | NOK | Fail |
| Comparative Example 5 | 0.956 | press method | 2.94 | 2.96 | NOK | Fail |
| Comparative Example 6 | 1.334 | press method | 3.70 | 3.71 | NOK | Fail |
| Comparative Example 7 | 0.001 | floating method | 1.83 | 4.08 | OK | Fail |
| Comparative Example 8 | 0.002 | floating method | 2.05 | 6.95 | OK | Fail |
| Comparative Example 9 | 0.005 | press method | 4.13 | 4.11 | OK | Fail |
| Comparative Example 10 | 0.004 | press method | 7.39 | 7.41 | OK | Fail |
| Comparative Example 11 | 0.006 | press method | 10.52 | 10.38 | OK | Fail |

As can be seen from Table 1, when the glass material formed by the press forming method illustrated in FIGS. 4 and 5 has the flatness of 4 μm or less and the surface roughness of 0.01 μm or less (Examples 1 to 5), the surface roughness reaches the criteria (0.2 nm or less) only by the first polishing process and the second polishing process. In such cases, the glass material passes the LUL endurance test.

On the other hand, as can be seen from Table 1, when the glass material formed by the press forming method illustrated in FIGS. 4 and 5 has the flatness of 4 μm or less and the surface roughness exceeding 0.01 μm (Comparative examples 1 to 6), the surface roughness does not reach the criteria (0.2 nm or less) only by the first polishing process and the second polishing process. In such cases, the glass material fails in the LUL endurance test.

As can be seen from Table 1, although the glass material formed by the floating method (Comparative examples 7 and 8) has the good surface roughness and flatness, a warp is generated due to a stress difference of the surfaces, because there is a difference of ion exchange between one surface in which the tin diffusion layer exists and the other surface in which the tin diffusion layer does not exist by the chemically strengthening process, and the flatness degraded by the warp is not improved only by the first polishing process and the second polishing process. In such cases, the glass material fails in the LUL endurance test.

or less (Comparative examples 9 to 11), the flatness does not satisfy the criteria (4 μm or less) only by the first polishing process and the second polishing process. In such cases, the glass material fails in the LUL endurance test.

As is clear from Examples 1 to 5 and Comparative Examples 1 to 11, when the glass material formed by the press forming method of the embodiment has the flatness of 4 μm or less and the surface roughness of 0.01 μm or less, the surface roughness and the flatness satisfy the criterion required as the glass substrate for magnetic disk only by the first polishing process and the second polishing process without performing the grinding process having the large machining allowance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A manufacturing method of glass substrate for a magnetic disk including a pair of principal surfaces, the method comprising:
   performing press forming to molten glass to prepare a sheet glass material, the sheet glass material having a roughness of the principal surface of 0.01 µm or less and target flatness of a glass substrate for magnetic disk, the press forming including:
      cutting molten glass flowing out from a molten glass outflow port to form a lump of the molten glass that is separated from the molten glass flowing out from the molten glass outflow port; and
      after the cutting of the molten glass, forming the sheet glass material by performing the press forming to catch the lump while the lump is falling and sandwich the lump between surfaces of a pair of dies from both sides of a falling path of the lump, the dies being disposed opposite each other moving horizontally, and the dies being set to substantially a same temperature, and the dies being kept proximate to each other until the lump is cooled to become the sheet glass material; chemically strengthening the sheet glass material by dipping the sheet glass material in a chemically strengthening salt containing an alkali metal ion to form a compressive stress layer at least on the principal surfaces of the sheet glass material, thereby preparing a disk substrate; and
   polishing the principal surfaces of the disk substrate by pressing a polishing pad against the principal surfaces of the disk substrate while supplying a polishing solution including a polishing material between the disk substrate and the polishing pad, and relatively moving the disk substrate and the polishing pad, a thickness of the sheet glass material prepared in the press forming being larger than a target thickness of the glass substrate for magnetic disk by a polishing quantity of the principal surface polishing.

2. The manufacturing method of glass substrate for a magnetic disk according to claim 1, wherein the pair of dies is opened immediately after the press forming is performed to the lump while the lump is sandwiched between the surfaces of the pair of dies in the forming the sheet glass material.

3. The manufacturing method of glass substrate for a magnetic disk according to claim 1, wherein the target flatness as the glass substrate for magnetic disk is 4 µm or less.

4. The manufacturing method of glass substrate for a magnetic disk according to claim 1, further comprising scribing the sheet glass material between the forming and the polishing.

5. The manufacturing method of glass substrate for a magnetic disk according to claim 1, wherein
   the performing the press forming includes moving each of the pair of dies at substantially a same timing toward the lump to sandwich the lump between the surfaces of the pair of dies.

6. The manufacturing method of glass substrate for a magnetic disk according to claim 1, wherein
   the dies are set to substantially the same temperature such that the press forming forms the sheet glass material having a substantially even temperature distribution.

7. The manufacturing method of glass substrate for a magnetic disk according to claim 1, wherein
   the chemically strengthening of the sheet glass material is performed after the performing press forming and before any grinding or polishing is performed on the principle surfaces of the disk substrate.

8. The manufacturing method of glass substrate for a magnetic disk according to claim 1, wherein
   the polishing effects a machining of the principal surfaces of the disk substrate up to 10 micrometers.

9. The manufacturing method of glass substrate for a magnetic disk according to claim 1, wherein
   the polishing reduces the roughness of the principal surface to 0.2 nm or less.

* * * * *

UNITED STATES PATENT AND TRADEMARK OFFICE
CERTIFICATE OF CORRECTION

| | | |
|---|---|---|
| PATENT NO. | : 8,733,129 B2 | Page 1 of 1 |
| APPLICATION NO. | : 12/979176 | |
| DATED | : May 27, 2014 | |
| INVENTOR(S) | : Shinji Eda et al. | |

It is certified that error appears in the above-identified patent and that said Letters Patent is hereby corrected as shown below:

On the title page, please change the listing of item [75] from

[75] Inventors: Shinji Eda, Nirasaki (JP); Hideki Isono, Kofu (JP)

to

-- [75] Inventors: Shinji Eda, Yamanashi (JP); Hideki Isono, Yamanashi (JP) --

Signed and Sealed this
Fourteenth Day of October, 2014

Michelle K. Lee
*Deputy Director of the United States Patent and Trademark Office*